(12) United States Patent
Grant

(10) Patent No.: US 10,797,872 B2
(45) Date of Patent: Oct. 6, 2020

(54) QUANTUM RANDOM NUMBER GENERATOR LOCK

(71) Applicant: Quantum Lock Technologies LLC, Knoxville, TN (US)

(72) Inventor: Erica Grant, Knoxville, TN (US)

(73) Assignee: Quantum Lock Technologies LLC, Knoxville, TN (US)

( * ) Notice: Subject to any disclaimer, the term of this patent is extended or adjusted under 35 U.S.C. 154(b) by 0 days.

(21) Appl. No.: 16/657,093

(22) Filed: Oct. 18, 2019

(65) Prior Publication Data

US 2020/0266980 A1    Aug. 20, 2020

Related U.S. Application Data

(60) Provisional application No. 62/806,965, filed on Feb. 18, 2019.

(51) Int. Cl.
*H04L 9/08*    (2006.01)
*G06N 10/00*    (2019.01)
*H04L 9/14*    (2006.01)

(52) U.S. Cl.
CPC .......... *H04L 9/0869* (2013.01); *G06N 10/00* (2019.01); *H04L 9/0825* (2013.01); *H04L 9/14* (2013.01)

(58) Field of Classification Search
CPC ....... H04L 9/0869; H04L 9/0825; H04L 9/14; G06N 10/00
See application file for complete search history.

(56) References Cited

U.S. PATENT DOCUMENTS

| 6,415,386 B1* | 7/2002 | Shi | G07C 9/00309 340/5.2 |
|---|---|---|---|
| 10,121,301 B1* | 11/2018 | Ren | G07C 9/00896 |
| 2009/0064744 A1* | 3/2009 | Wang | B60R 25/25 70/278.1 |
| 2014/0201536 A1* | 7/2014 | Fiske | H04L 9/0844 713/183 |
| 2014/0232524 A1* | 8/2014 | Nakai | B60R 25/24 340/5.61 |
| 2017/0211295 A1* | 7/2017 | Lin | E05B 47/0012 |
| 2017/0358160 A1* | 12/2017 | Gardiner | G06F 3/147 |

FOREIGN PATENT DOCUMENTS

WO    WO-2013025091 A1 *    2/2013    ........... H04L 9/3234

* cited by examiner

*Primary Examiner* — Ali S Abyaneh
(74) *Attorney, Agent, or Firm* — Chambliss, Bahner & Stophel, P.C.; Stephan D. Adams

(57) ABSTRACT

A lock system having a true random number generator (TRNG) configured to generate true random numbers that are based on physical phenomena, including one designated as a public key. A computer with a memory receives and stores a copy of the public key. The computer also receives a copy of a public key from a user device. A lock assembly is in electrical communication with the computer and is configured to switch from a locked mode to an unlocked mode in response to receiving an unlock command from the computer. The computer is configured to compare the stored copy of the public key generated by the TRNG to the copy of the public key received from the user device and to determine if they match. If the two public keys match, the computer sends the unlock command to the lock assembly.

13 Claims, 5 Drawing Sheets

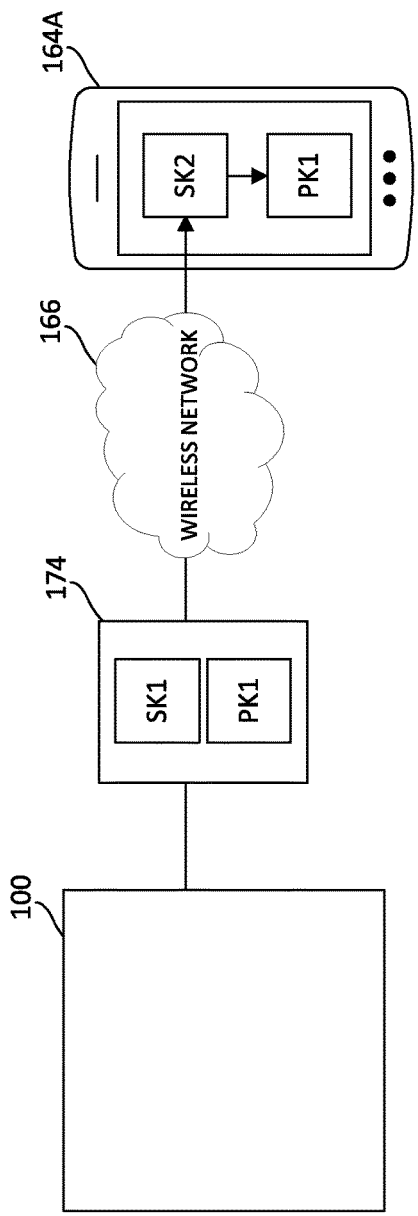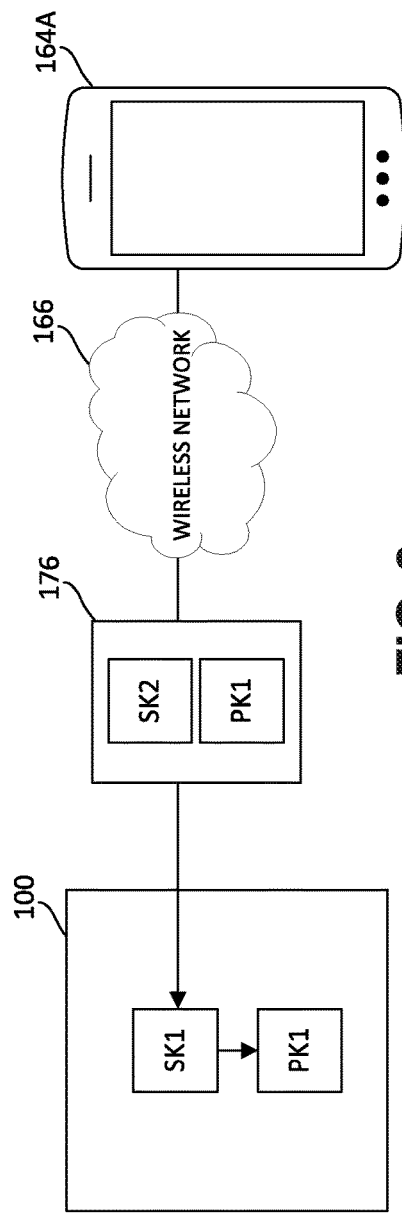

ND NUMBER
QUANTUM RANDOM NUMBER GENERATOR LOCK

CROSS-REFERENCE TO RELATED APPLICATIONS

This application claims the benefit of U.S. Provisional Application No. 62/806,965, filed Feb. 18, 2019, and entitled QUANTUM RANDOM NUMBER GENERATOR LOCK, which is incorporated herein by reference in its entirety.

FIELD

This invention relates generally to locks. More particularly, the present invention relates to locks that are secured and unsecured using unique codes that are generated by a true random number generator.

BACKGROUND

Conventional locks are prone to break-ins and are increasingly being replaced with "smart locks" in the name of increased convenience and security because no physical key is required and the locks can be unlocked using a mobile device. Unfortunately, smart locks only give the illusion of increased security. In actuality, they are even less secure than traditional locks. Because most smart locks are built only with convenience in mind, many still have a key face, which leaves them vulnerable to being physically picked using traditional lock picking methods. Additionally, passwords used by smart locks are often communicated between the smart lock and a mobile device wirelessly in plain text and are, therefore, susceptible to surveillance and interception. Attempts have been made to encrypt passwords using pseudo-random number generators (PRNG). In operation, PRNGs use a randomly-selected number as a "seed" and an algorithm then generates a sequence of numbers that appear random. However, if the seed is discovered, sophisticated parties can uncover the sequence of numbers generated by the PRNG.

Accordingly, what is needed, is a lock that offers the convenience of current "smart" locks, including the ability to be remotely locked and unlocked, while also being more secure against electronic hacking and physical lock picking.

NOTES ON CONSTRUCTION

The use of the terms "a", "an", "the" and similar terms in the context of describing embodiments of the invention are to be construed to cover both the singular and the plural, unless otherwise indicated herein or clearly contradicted by context. The terms "comprising", "having", "including" and "containing" are to be construed as open-ended terms (i.e., meaning "including, but not limited to,") unless otherwise noted. The terms "substantially", "generally" and other words of degree are relative modifiers intended to indicate permissible variation from the characteristic so modified. The use of such terms in describing a physical or functional characteristic of the invention is not intended to limit such characteristic to the absolute value which the term modifies, but rather to provide an approximation of the value of such physical or functional characteristic.

Terms concerning attachments, coupling and the like, such as "attached", "connected" and "interconnected", refer to a relationship wherein structures are secured or attached to one another either directly or indirectly through intervening structures, as well as both moveable and rigid attachments or relationships, unless otherwise specified herein or clearly indicated as having a different relationship by context. The term "operatively connected" is such an attachment, coupling or connection that allows the pertinent structures to operate as intended by virtue of that relationship.

The term "true random number generator" or "TRNG" means a device that generates random numbers from a physical process and not through a mathematical algorithm. The physical processes may include microscopic-level phenomena or quantum-level phenomena. There are many methods by which a truly random number can be generated using quantum mechanics or quantum-level information. As a non-limiting example, true random numbers may be generated by measuring the random spin of photons. The spin or polarization of photons is inherently random in nature. Certain materials, shaped into crystals, are known to interact with photons and to admit or reject photons based on their spin. By directing a stream of photons at the crystal (such as light from a laser), some photons are admitted while others are reflected. Detectors placed on each side of the crystal detect reflected photons as 1's and admitted photons as 0's. To create a 256-digit random number, 256 of the random 1's and 0's are collected. The term "true random number" means this random number generated by a TRNG. The term "user device" means a device capable of receiving and transmitting encrypted messages and encrypting and decrypting messages, such as a mobile phone, smart key or key fob. The term "wireless network" means a Bluetooth, Wi-Fi, or other similar means of wireless connectivity.

The use of any and all examples or exemplary language (e.g., "such as" and "preferably") herein is intended merely to better illuminate the invention and the preferred embodiments thereof, and not to place a limitation on the scope of the invention. Nothing in the specification should be construed as indicating any element as essential to the practice of the invention unless so stated with specificity.

SUMMARY

The above and other problems are addressed by a lock system having a true random number generator (TRNG) configured to generate true random numbers that are based on physical phenomena, including one designated as a public key. A computer with a memory receives and stores a copy of the public key. The computer also receives a copy of a public key from a user device. A lock assembly is in electrical communication with the computer and is configured to switch from a locked mode to an unlocked mode in response to receiving an unlock command from the computer. The computer is configured to compare the stored copy of the public key generated by the TRNG to the copy of the public key received from the user device and to determine if they match. If the two public keys match, the computer sends the unlock command to the lock assembly.

BRIEF DESCRIPTION OF THE DRAWINGS

Further advantages of the invention are apparent by reference to the detailed description when considered in conjunction with the figures, which are not to scale so as to more clearly show the details, wherein like reference numerals represent like elements throughout the several views, and wherein:

FIGS. 5-8 are schematic diagrams illustrating a process for encrypting, decrypting and transmitting private and public keys between locks and user devices according to an embodiment of the present invention.

DETAILED DESCRIPTION

Figure 2:
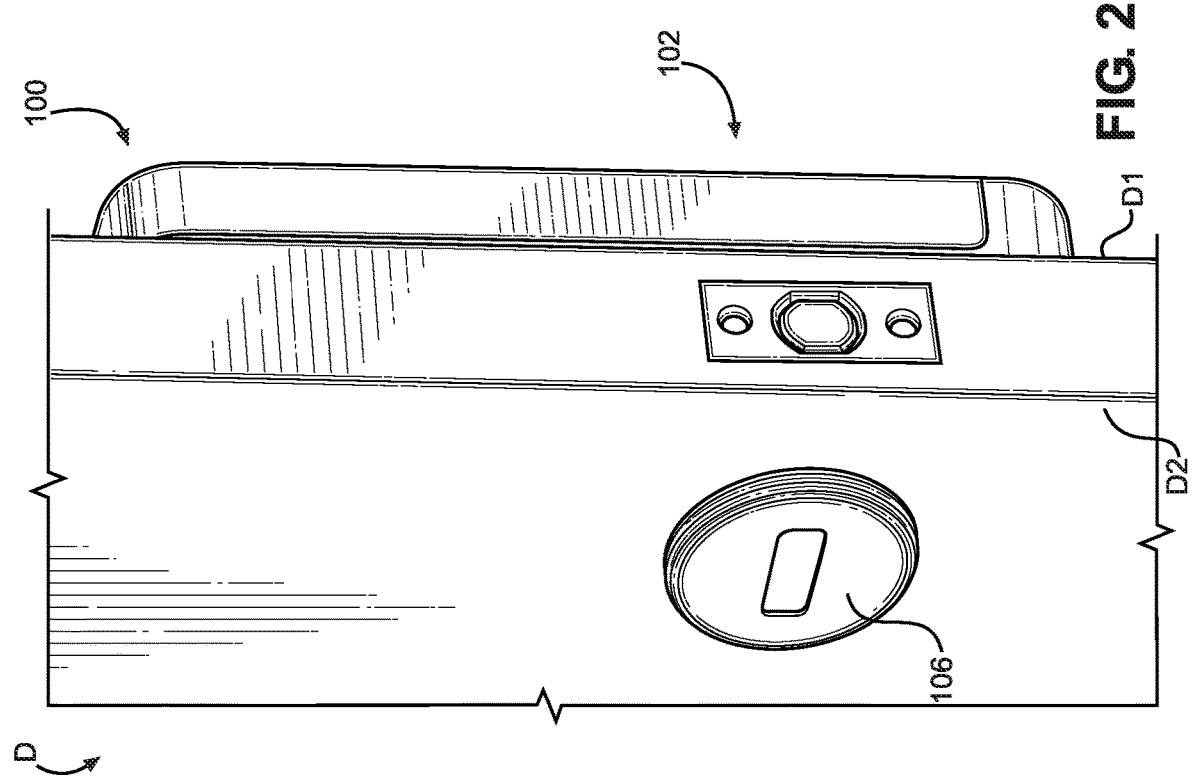
FIG. 2 is a perspective view showing the lock system of FIG. 1 mounted to a door.
Figure 1:
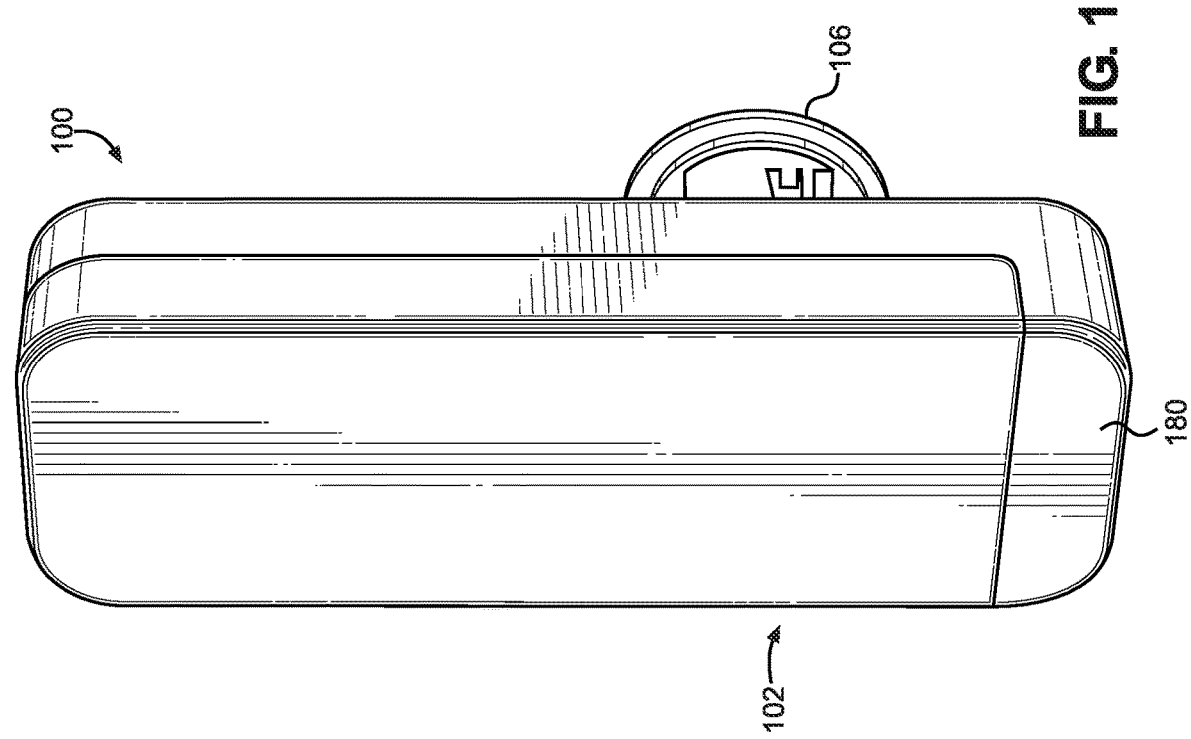
FIG. 1 is a front perspective view showing a lock system according to an embodiment of the present invention.
Figure 3:
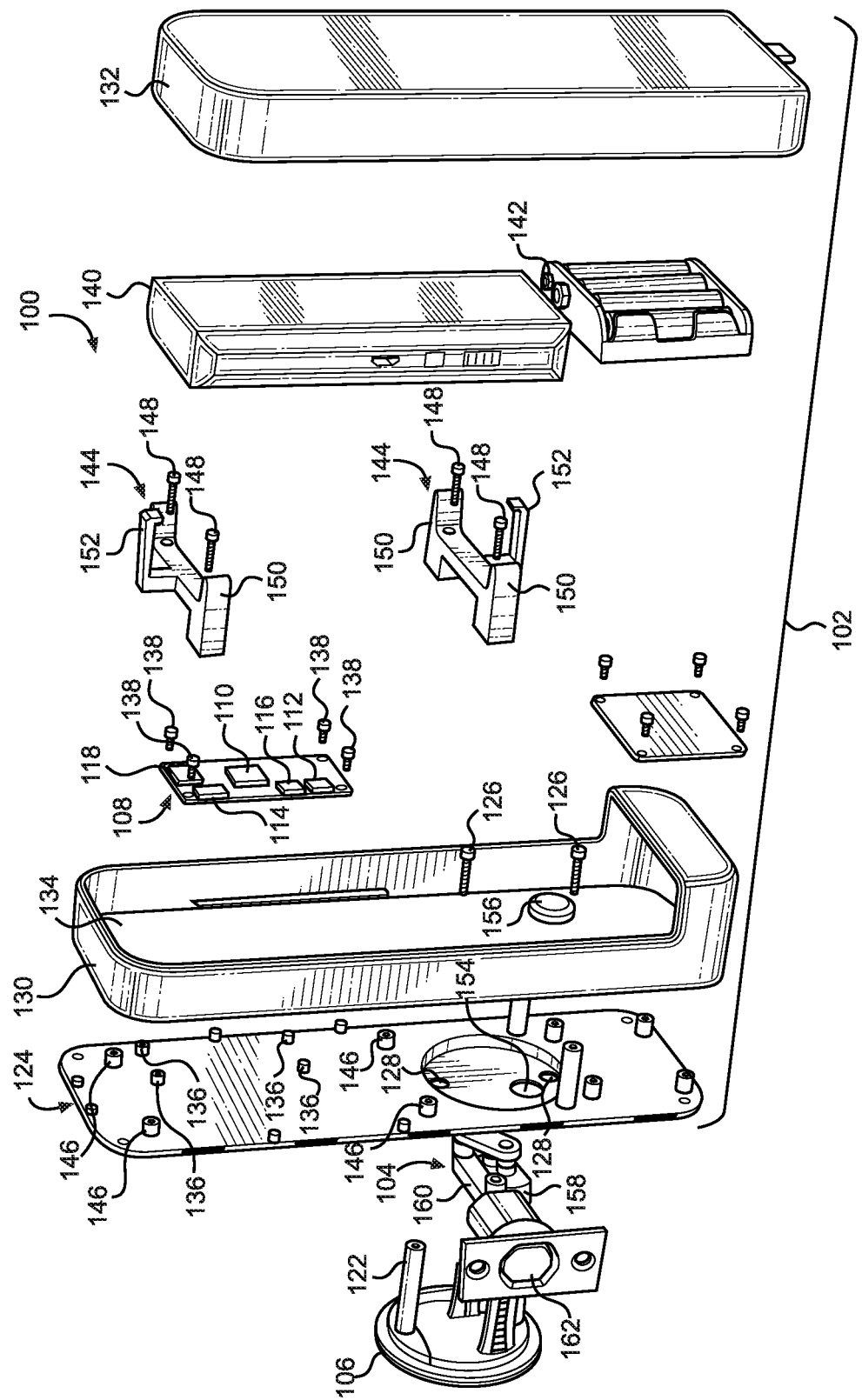
FIG. 3 is an exploded view showing the lock system of FIG. 1.

Referring now to the drawings in which like reference characters designate like or corresponding characters throughout the several views, there is shown in FIGS. 1-3, a computer-controlled lock system for securing lock 100 that may be mounted to door D according to an embodiment of the present invention. In this embodiment, lock 100 generally includes control assembly 102 that is mounted to rear side D1 door D (e.g., inside of a room secured by the lock); lock assembly 104 that is located within the door and that is electrically connected to and controlled by the control assembly; and front plate 106 that is mounted to front side D2 of the door (e.g., outside of the room secured by the lock). Front plate 106 extends through the door and is attached to the control assembly. For increased security, front plate 106 is preferably blank (i.e., does not have a slot for a key) to prevent lock 100 from being physically picked using traditional lock picking methods. In other embodiments, without limitation, lock 100 could include locks found on doors in a hotel, school, office, etc. Lock 100 could also be found on other types of doors, lids, etc., such as P.O. boxes, safes, vehicle door and ignition, bicycle locks, padlocks, and the like.

Control assembly 102 includes onboard computer 108, having CPU 110, memory 112, and controller 114, which controls the operation of lock assembly 104. Under certain conditions, computer 108 sends an unlock command to lock assembly 104 that switches lock 100 from a locked mode, where the door D is prevented from opening by the lock, to an unlocked mode, where the door can be opened. Computer 108 may also send a lock command to lock assembly 104 to lock the door under other conditions, as discussed below.

Computer 108 carries out the unlocking operation in response to receiving a valid and correct public key. This public key is received at computer 108 by transmitter-receiver 116, which is configured to wirelessly send or receive information and to store that information to memory 112. The public key is a random number that is generated by random number generator 118, which, unlike the prior art, is a true random number generator (TRNG) that generates true random numbers. In preferred embodiments, the random numbers are generated based on quantum-level phenomena. The random numbers generated by TRNG 118 are stored to control assembly 102 in memory 112. A copy of the public key is then transmitted and stored to a user device (not shown), which could be a programmable key card, a key fob, a smartphone, or another similar device, via transmitter-receiver 116. When a user later transmits a public key to control assembly 102, the public key is verified by CPU 110 to ensure that the public key it received from the user device matches the previously-issued public key that is stored to memory 114. If the transmitted public key matches the stored public key, computer 108, via controller 110, sends the unlock command to lock assembly 104 to switch the lock to the unlocked mode.

Control assembly 102 is located on rear side D1 of door D, front plate 106 is located on front side D2 of the door, and lock assembly 104 is located within the door between the front and rear sides. Elongate receivers 122 extend away from a back surface of front plate 106, through door D, past lock assembly 104, and to a back surface of door mounting plate 124. Prior to mounting door mounting plate 124 to door D, lock assembly 104 is inserted into the door D. Door mounting plate 124 is attached to front plate 106 by passing threaded fasteners 126 through openings 128 and then into threaded openings at the ends of receivers 122. Lock housing 130 surrounds door mounting plate 124 and, together with front cover 132, form an enclosure for housing the other components of control assembly 102. In this particular embodiment, lock housing 130 is fixedly connected to the door backing plate 124, such as through welding, gluing, etc. However, in other embodiments, lock housing 130 is separable from door backing plate 124. Additionally, front cover 132 slides or flips downwards to cover a front opening 134 formed in lock housing 130.

Computer 108 is mounted to openings 136 formed in door mounting plate 124 via threaded connectors 138. In addition, a pair of battery packs, including primary rechargeable battery pack 140 and backup battery pack 142 are mounted to door mounting plate 124. A pair of mounting clips 144 are mounted to openings 146 via threaded connectors 148. Each mounting clip 144 has a pair of spaced apart shoulders 150 and a bendable securing arm 152. Top and bottom ends of primary battery 140 are inserted into clips 144 between shoulders 150 and are held securely by securing arm 152. Primary battery 140 may be removed for recharging, replacement, etc. by bending securing arms 152 outwards and extracting the battery from the clips. In certain embodiments, primary battery pack 150 and backup battery pack 142 are each connected to and provide power to each of computer 108 and lock assembly 104 by a wired connection. Preferably, backup battery pack 142 is only activated if primary battery pack 140 fails or is removed from the control assembly 102 for recharging, replacement, etc. Alternatively, direct power (e.g., 120-volt supply) may be provided in addition or in place of batteries 140, 142.

The wired connection is formed between control assembly 102 and the lock assembly 104 by passing wires (not shown) from control assembly through aperture 154 in the door mounting plate 124 to lock assembly. Preferably, to protect the wires, protective grommet 156 or other similar device is provided at aperture 154. Lock assembly 104 includes motor 158 or other similar apparatus, such as a solenoid magnet, connected to actuator arm 160 that moves deadbolt 162 in and out to engage or disengage a strike plate (not shown) on a door jamb in order to lock or unlock the deadbolt and to prevent or allow the door to be opened.

Figure 4:
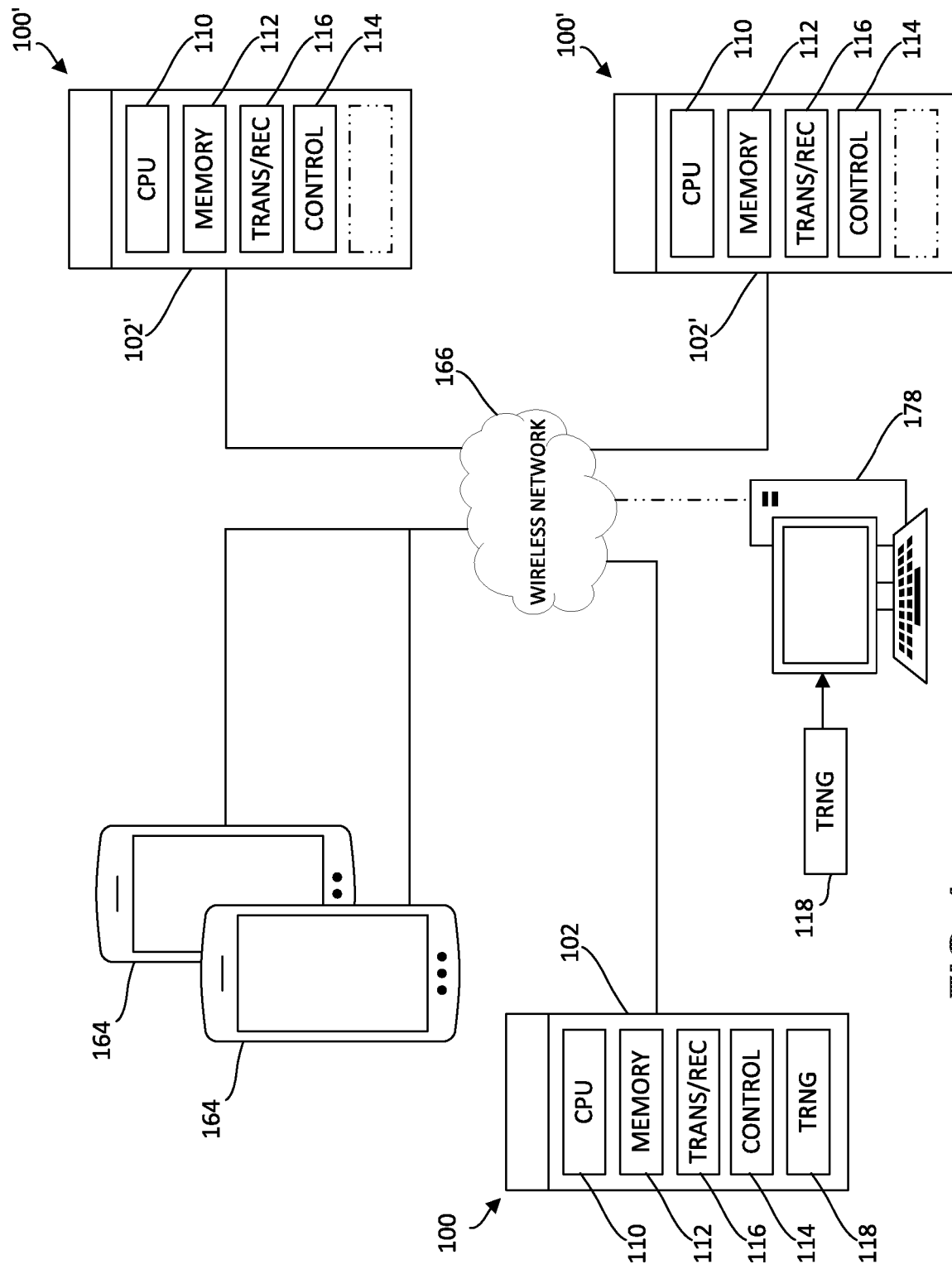
FIG. 4 is a schematic diagram illustrating a system of locks according to an embodiment of the present invention controlled by a pair of user devices over a wireless network.

With reference now to FIG. 4, there is shown lock 100 having control assembly 102 that is identical to that discussed above (referred to as a "primary lock" in this example). Also provided is a pair of secondary locks 100' having control assemblies 102' that are structurally similar to primary lock 100 and control assembly 102 but that lack TRNG 118. Primary lock 100 and secondary locks 100' are connected together with one another and with one or more user devices 164 over wireless network 166. This scenario might occur, for example, at a residence where a single, more expensive primary lock 100 (e.g., a front door lock) is used to generate all of the public keys used to unlock the door locks throughout the house, including the less expensive secondary locks 100' (e.g., a back door lock). Alternatively, the job of generating and disturbing public keys to locks 100' and user devices 164 could be carried out by a central computer 178 having a TRNG 118. This scenario might occur, for example, in a hotel, where user devices 164 are room keys and secondary locks 100' are located on guest doors that are programmed by hotel staff using computer 178 located at the front desk of the hotel.

Before locks 100, 100' can be utilized by a user, the lock and user devices 164 must be initialized by being provided with copies of public keys since public keys are used to unlock the locks. For lock 100, the TRNG 118 is located onboard with the control assembly 102. Therefore, once the public key is generated, it can easily be saved directly to the onboard memory 112. However, since locks 100' and user devices 164 are likely remote from the TRNG 118, the public key must be transferred to them prior to being saved to and used by those devices. This transfer could occur using a hard or physical connection (e.g., a USB connection, memory stick, etc.) to move the public key between lock 100 and lock 100' before the locks are installed. More preferably, however, the public key is transferred from lock 100 to lock 100' and to user devices 164 wirelessly (e.g., Wi-Fi or Bluetooth) over wireless network 166, as further discussed below.

Once transferred, a copy of the public key is saved to user devices 164 and to locks 100'. In certain embodiments, the same public key may be used for each of the locks 100, 100'. In that scenario, a copy of a single identical public key would be saved to each lock 100, 100' and to user devices 164 (i.e., one public key total across the entire system). However, in other embodiments, different public keys are generated by TRNG 118 for each of the locks 100, 100' (i.e., three public keys total across the entire system). In that case, each lock 100, 100' would have its own unique public key and the user devices 164 would store a copy of three different public keys. Even more preferably, each user device 164 is provided with public keys that are unique to that device. In that case, for the illustrated embodiment, a total of six unique public keys would be generated. The locks 100, 100' would each have copies of two different public keys. One of those public keys would be used by one user device 164 and the other would be used by the other user device. Once the system is initialized, when the user wishes to unlock one of the locks 100, 100' she transmits a copy of the public key stored on her device 164 back to the selected lock. CPU 110 compares the transferred public key to the public key that is stored to memory 112. If they match, CPU 110 directs controller 116 to send the unlock command and lock 100 is unlocked.

Preferably, once lock 100 has been unlocked and the door that the lock is mounted to is opened, the lock automatically switches back to the locked mode so that the door locks automatically when closed. In other embodiments, user device 164 provides means for sending a lock command, such as a "lock" button, to switch lock 100 from the unlocked mode to the locked mode. In other embodiments, a manual override for locking or unlocking lock 100 may be provided on the lock. For example, in some embodiments, lock 100 works in conjunction with a door handle and turning the door handle automatically unlocks the lock. In still other embodiments, a thumb turn or other manual override device may be provided on lock 100 to either lock or unlock the lock.

In preferred embodiments, the public keys are single-use only and may only be used once to unlock lock 100. In that case, public keys are generated sequentially by TRNG 118 for each user device 164. After the public key stored on a particular user device 164 has been used, TRNG 118 generates a new public key for that particular device, which newly-generated key must be used the next time that that particular device is used to open the door.

Figure 5:
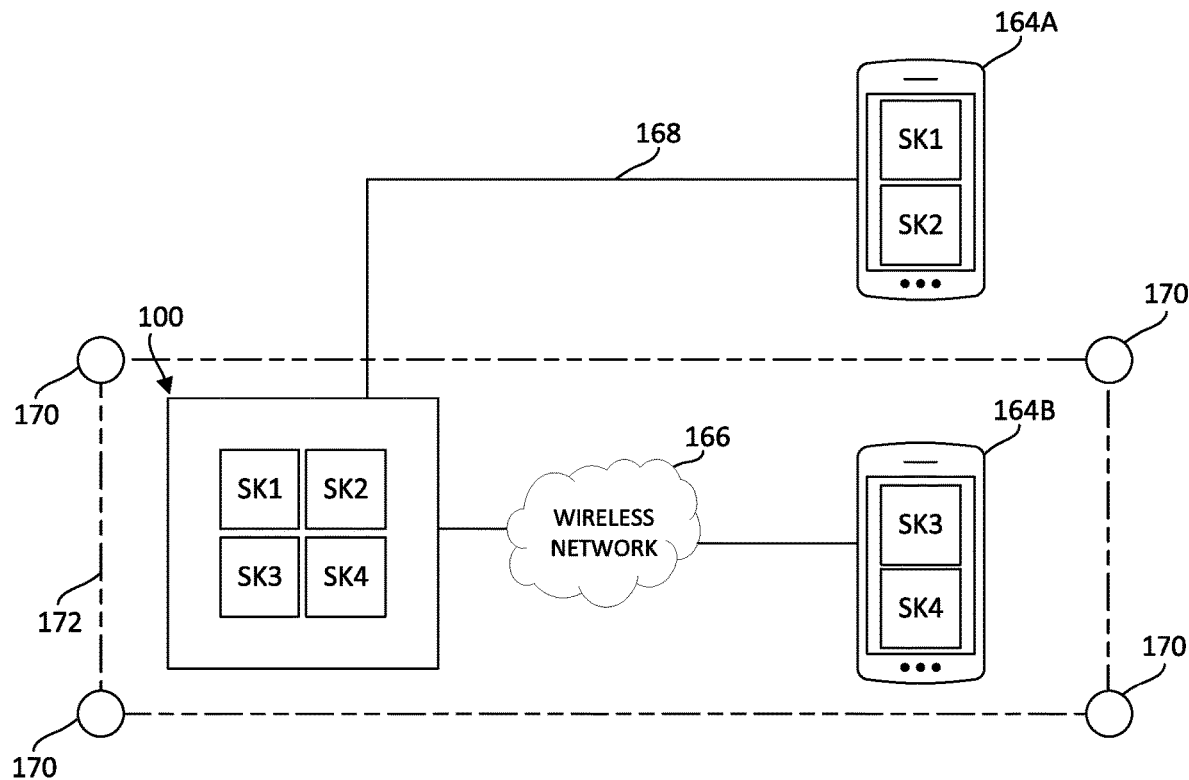

Preferably all wireless transfers of public (and private) keys, such as between lock 100 and lock 100' or user device 164 and vice versa, used in the locking and unlocking process occur in a secure format using two-way asymmetric (i.e., public key) encryption. Such an encryption method is illustrated in FIGS. 5-8. In FIG. 5, lock 100 and two user devices 164A, 164B are shown. A first public key PK1 will be transferred from lock 100 to user device 164A and a second, different public key PK2 will be transferred from the lock to user device 164B for use in unlocking the lock. However, before either of those transfers occurs, the first and second public keys PK1, PK2 are encrypted. As discussed below, they are encrypted and decrypted using two private (or secret) keys each. One set of two private keys, SK1 and SK2, is used to encrypt and decrypt the first public key PK1 when it is transferred between the lock 100 and user device 164A. A second, different set of two private keys, SK3 and SK4, is used to encrypt and decrypt the second public key PK2 when it is transferred between the lock 100 and user device 164B. Before that encryption can occur, the private keys, SK1 thru SK4, must be transferred and saved to the respective user device 164A, 164B.

Preferably the transfer of private keys, SK1 thru SK4, from lock 100 to user device 164A and 164B occurs via a secure connection and not via an unsecured wireless connection. Similarly, the transfer of private keys, from computer 178 to lock 100' (shown in FIG. 4) occurs via a secure connection and not via an unsecured wireless connection. These transfers may occur, for example, via a hardwired, USB, SD card, or other direct (i.e., not wireless) connection, such as connection 168 between the lock 100 and user device 164A. Private keys, SK1 thru SK4, may also be transferred wirelessly over wireless network 166, which may include a wireless broadband, optical, near field or induction, Wi-Fi, or Bluetooth connection. However, in that case, since many forms of wireless communication are prone to unauthorized interception, additional security measures should be implemented. One way that security for this this wireless transmission can be improved is through the use of quantum key distribution (QKD). In other embodiments, 2-factor authentication could be used, where a third party, such as an administrative user, must confirm the transfer of the private keys to a known device. Yet another way to improve security is by ensuring that the wireless transfer of the public key occurs between devices that are within a given proximity to one another. This could be accomplished through geo-fencing using GPS or proximity detection using Bluetooth and the like. As illustrated in FIG. 5, a plurality of proximity beacons 170 may be used to create a mesh or field 172. In that case, in order for lock 100 to wirelessly transfer public keys or private keys to another device, such as device 164B, both devices must be within field 172.

Figure 6:
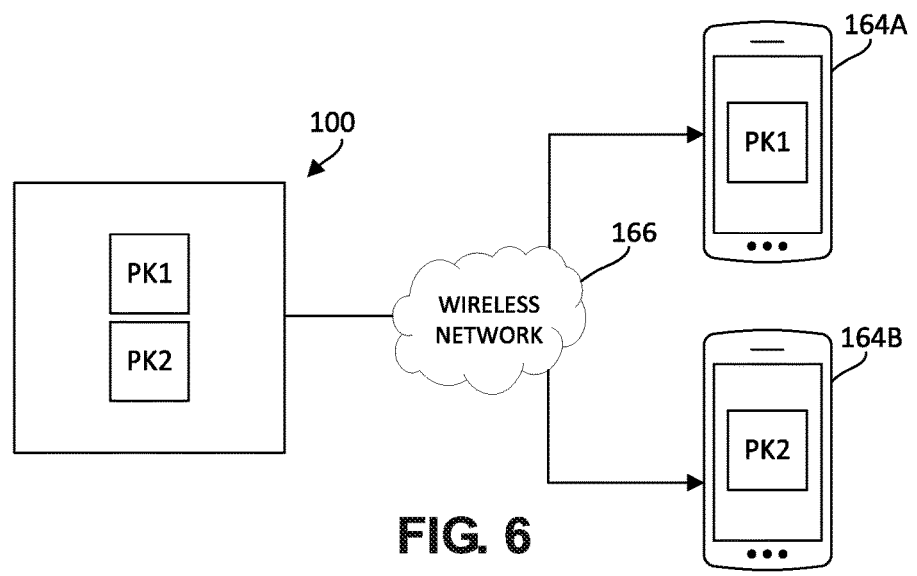

As shown in FIG. 6 and as further detailed below, once copies of two private keys are saved to each device that intends to share a public key (e.g., lock 100 and user device 164A or lock 100 and user device 164B), information, such as the public keys, can be securely transferred between those devices. As discussed above, in this particular case, lock 100 is provided with an onboard TRNG 118 (FIG. 4) that generates random numbers, including both public keys and private keys, which are then stored on the lock. With reference to FIG. 7, public key PK1 may be encrypted by lock 100 with private key SK1 using an encryption algorithm, such as the RSA algorithm, the Advanced Encryption Standard (AES) algorithm, or other encryption algorithms, to form first encrypted message 174. First encrypted message 174 may then be securely transferred to user device 164A over wireless network 166. First encrypted message 174 is then decrypted by user device 164A using private key SK2 to retrieve public key PK1, which is stored on the user device.

When the user wishes to unlock lock 100, the process is reversed in order to transmit public key PK1 back to the lock. More particularly, public key PK1 is encrypted by user device 164A with private key SK2 using an encryption algorithm to form a second encrypted message 176. Second encrypted message 176 may then be securely transferred to lock 100 over wireless network 166. Second encrypted message 176 is then decrypted by lock 100 using private key SK1 to retrieve public key PK1. As described above, the computer associated with lock 100 then carries out a verification step to ensure that the public key retrieved from second encrypted message 176 matches the public key that was previously transmitted to user device 164A via first encrypted message 174. If the public keys match, the lock 100 is switched to the unlock mode. In certain preferred embodiments of the invention, lock and unlock steps are recorded and verified using a distributed ledger.

Referring again to FIG. 4, a similar encryption procedure is used when public and private keys are generated by a central computer 178. In that scenario, certain of the random numbers generated by the TRNG 118 are the public and private keys that will ultimately be used by hotel guests to unlock their hotel door. These keys are transferred to guest key cards in two encrypted stages. First, the public and private keys are transferred from computer 178 to locks 100' securely in encrypted form and are then transferred from locks 100' to hotel guests' devices 164 in a second secure and encrypted form. Thus, two encryption stages are required in that scenario.

In order for this transfer to occur, a first set of private keys must be transmitted from the computer 178 to locks 100'. This could be accomplished using a wired connection, such as connection 168 (FIG. 5) or via a wireless connection that has added security, such as taking place within a given proximity, such as field 172. Once those private keys are stored to both computer 178 and to lock 100', public keys may be transferred, as discussed above, which then establishes a secure channel for communicating information (i.e., two-way asymmetric encryption). From there, public and private keys that will be used by hotel guests are transferred via the secure communication channel that has been established from TRNG 118, to computer 178, to computer 100', and then to user device 164.

Finally, with reference again to FIG. 1, preferred embodiments of the invention include a visual indicator 180, such as an LED light, or audio indicator, such as a siren, that that indicates at least one of: (i) that the lock is in the locked mode; (ii) that the lock is in the unlocked mode; (iii) the lock switching from the locked mode to unlocked mode or vice versa; or (iv) a malfunction state. For example, when the lock 100 is in the locked mode, visual indicator 180 illuminates green and, when the lock is in the unlocked mode, visual indicator illuminates red. When lock 100 is in the process of unlocking, visual indicator 180 flashes red. When lock 100 is in the process of locking, visual indicator 180 flashes green. When lock 100 is in a malfunction state, such as when a battery has died or the lock has become disconnected form the wireless network, visual indictor 180 illuminates amber.

Although this description contains many specifics, these should not be construed as limiting the scope of the invention but as merely providing illustrations of some of the presently preferred embodiments thereof, as well as the best mode contemplated by the inventor of carrying out the invention. The invention, as described herein, is susceptible to various modifications and adaptations as would be appreciated by those having ordinary skill in the art to which the invention relates.

What is claimed is:

1. A method for locking and unlocking a lock assembly comprising the steps of:
    A. providing a hub computer having a true random number generator (TRNG) configured to generate true random numbers that are based on quantum-level physical phenomena;
    B. providing a lock assembly that is in remote electrical communication with the hub computer and that has an onboard computer having a memory and that is in electrical communication with the hub computer, the lock assembly configured to switch from a locked mode to an unlocked mode in response to an unlock command issued by the onboard computer;
    C. generating a public key comprising a true random number with the hub computer;
    D. with the onboard computer, receiving a copy of the public key from the hub computer, storing the copy of the public key to the memory, and receiving a copy of a public key from a user device communicating with the onboard computer over a short-range wireless network;
    E. with the onboard computer, comparing the stored copy of the public key generated by the hub computer to the copy of the public key received from the user device and sending the unlock command to the lock assembly if the public keys match one another.

2. The method of claim 1 further comprising the steps of
    F. wirelessly transmitting a copy of the public key from the lock assembly to the user device via a first encrypted message;
    G. retrieving the public key at the user device by decrypting the first encrypted message and storing the copy of the public key on the user device;
    H. wirelessly transmitting a copy of the public key from the user device to the lock assembly via a second encrypted message; and
    I. retrieving the public key at the lock assembly by decrypting the second encrypted message.

3. The method of claim 2 further comprising the steps of:
    J. prior to Step F, generating a pair of private keys with the TRNG, transmitting copies of the private keys from the TRNG to the lock assembly and to the user device, and storing the copies of the private keys to the lock assembly and user device as a first private key and a second private key;
    K. producing the first encrypted message by encrypting the public key with the first private key;
    L. decrypting the first encrypted message using the second private key;
    M. producing the second encrypted message by encrypting the public key with the second private key; and
    N. decrypting the second encrypted message using the first private key.

4. The method of claim 3 wherein, at Step J and prior to Step K, the copies of the pair of private keys are first transmitted in encrypted form from the TRNG to the lock assembly using public key encryption and copies of the pair of private keys are transmitted in encrypted form from the lock assembly to the user device using public key encryption.

5. The method of claim 1 wherein the TRNG is configured to generate a plurality of public keys that are each single use only such that the computer transmits the unlock command in response to receiving each public key only one time and the computer is updated to transmit the unlock command in response to a different one of the plurality of public keys each time a public key is used.

6. The method of claim 5 wherein a newly-generated public key is generated by the TRNG following the generation of a prior-generated public key and after the computer transmits the lock command in response to receiving the immediately-prior generated public key.

7. The method of claim 1 further comprising:
  F. providing two or more lock assemblies wirelessly connected together that are each associated with a different building door in a system of building doors, each of the two or more lock assemblies configured to transmit the unlock command in response to being provided with the immediately-prior generated public key transmitted from the user device;
  G. providing the immediately-prior generated public key to one of the two or more lock assemblies from the user device to switch that lock assembly only to an unlocked mode while the other lock assembly remains unchanged;
  H. transmitting a lock command to the one lock assembly and locking the building door associated with the one lock assembly;
  I. generating the newly-generated public key;
  J. updating the computer of each of the two or more lock assemblies such that each computer is configured to transmit the unlock command in response to being provided with the newly-generated public key.

8. The method of claim 1 wherein the true random numbers are generated based on a random spin characteristic of a quantum particle.

9. The method of claim 8 wherein the true random numbers are generated based on whether photons in a stream of photons directed at a crystal are admitted or reflected by the crystal.

10. A method for securing a system of building doors comprising the steps of:
  A. providing a plurality of building doors, each with a lock assembly;
  B. receiving one or more public keys at a central computer, where each public key is a random number generated by a true random number generator (TRNG) based on quantum-level phenomena;
  C. storing a copy of one or more of the public keys to one of the plurality of lock assemblies;
  D. transmitting a copy of a first of the one or more public keys from the one lock assembly to a first user device;
  E. with the first user device, transmitting a public key to the one lock assembly;
  F. with the lock assembly, comparing the stored public key to the public key provided by the first user device to determine if the stored public key matches the public key provided by the first user device and, if the stored public key matches the public key provided by the first user device, switching the one lock assembly to an unlocked mode.

11. The method of claim 10 further comprising the steps of:
  G. transmitting a copy of a second of the one or more public keys from the one lock assembly to a second user device;
  H. with the second user device, transmitting a public key to the one lock assembly;
  I. with the lock assembly, comparing the stored public key to the public key provided by the second user device to determine if the stored public key matches the public key provided by the second user device and, if the stored public key matches the public key provided by the second user device, switching the one lock assembly to an unlocked mode.

12. The method of claim 11 further comprising the steps of:
  J. transmitting a copy of a third of the one or more public keys from the one lock assembly to a third user device;
  K. with the third user device, transmitting a public key to a second of the plurality of lock assemblies;
  L. with the second lock assembly, comparing the stored public key to the public key provided by the third user device to determine if the stored public key matches the public key provided by the third user device and, if the stored public key matches the public key provided by the third user device, switching the second lock assembly to an unlocked mode.

13. A lock system for securing a system of building doors, the lock system comprising:
  a true random number generator (TRNG) configured to generate true random keys that are based on quantum-level physical properties;
  a hub computer configured to receive one or more true random keys that are sent from the TRNG and further configured to transmit the true random keys to a lock assembly;
  a plurality of lock assemblies that are each configured to mount to and to secure one of said building doors, that are configured to switch from a locked mode to an unlocked mode in response to an unlock command, and that are each in remote communication with the hub computer, each of the lock assemblies having an onboard computer that receives and stores to a memory true random keys received from the hub computer, wherein each lock assembly is configured to transmit one or more of the true random keys stored to the memory to one or more user devices, and
  wherein each of the lock assemblies is configured to receive keys transmitted from user devices and wherein, after a key is received from one of said user devices, the onboard computer of each lock assembly is configured to compare true random keys that are stored to the memory to the received key to determine if at least one of the true random keys that are stored to the memory match the received key and, if at least one of the true random keys that are stored to the memory match the received key, to send said unlock command to switch the lock assembly to said unlocked mode.

* * * * *